Nov. 17, 1964  P. H. STURM  3,157,414
SWIVEL JOINT FOR HYDRAULIC DREDGE PIPE LINES
Filed Aug. 28, 1961  4 Sheets-Sheet 1

INVENTOR
PATRICK HENRY STURM
BY *Robb & Robb*
ATTORNEYS

INVENTOR
PATRICK HENRY STURM
BY Robb & Robb
ATTORNEYS

Nov. 17, 1964 P. H. STURM 3,157,414
SWIVEL JOINT FOR HYDRAULIC DREDGE PIPE LINES
Filed Aug. 28, 1961 4 Sheets-Sheet 3
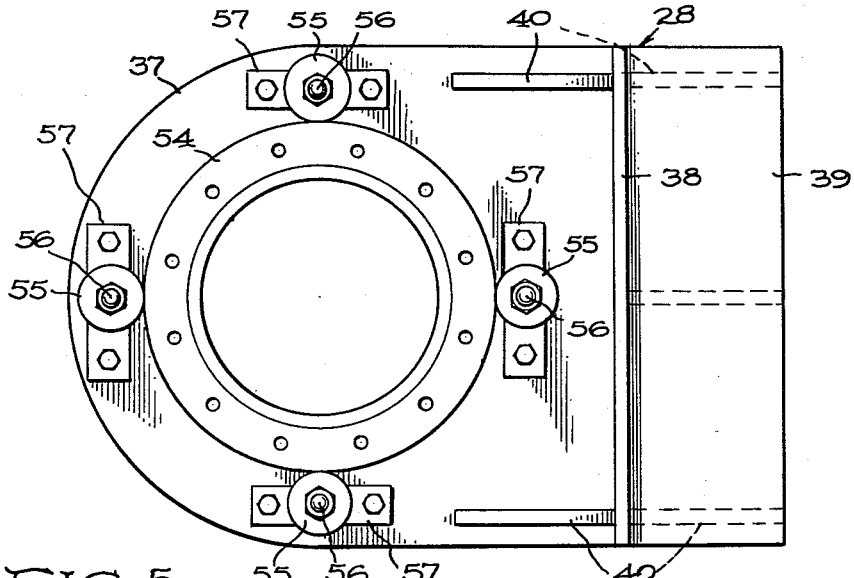
FIG. 5.
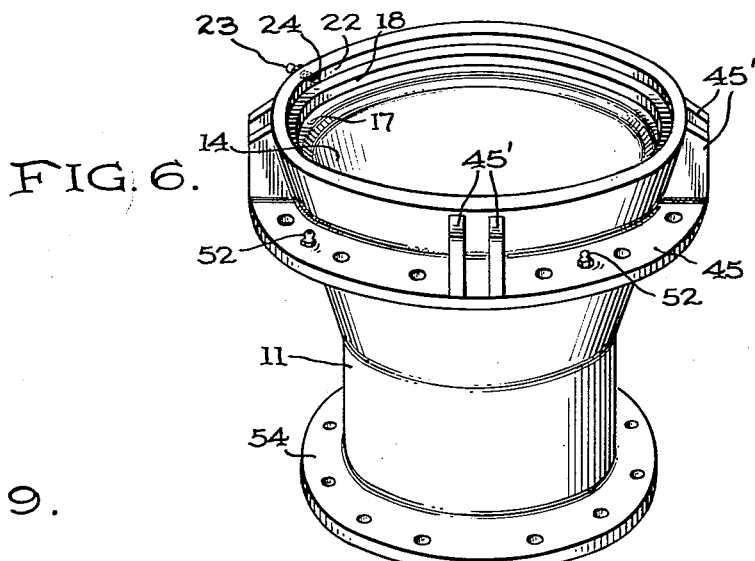
FIG. 6.
FIG. 9.
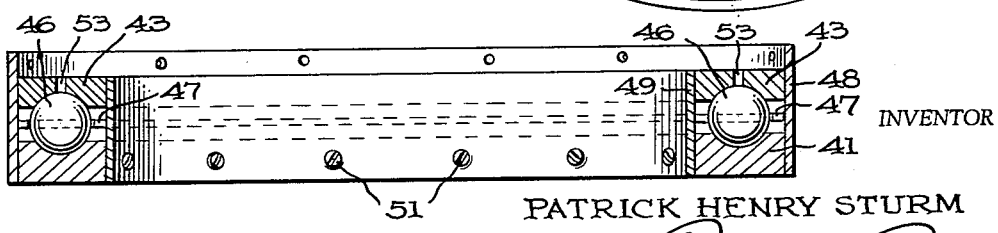
INVENTOR
PATRICK HENRY STURM
BY Robb & Robb
ATTORNEYS Nov. 17, 1964 — P. H. STURM — 3,157,414
SWIVEL JOINT FOR HYDRAULIC DREDGE PIPE LINES
Filed Aug. 28, 1961 — 4 Sheets-Sheet 4

INVENTOR
PATRICK HENRY STURM
BY Robb & Robb
ATTORNEYS

United States Patent Office 3,157,414
Patented Nov. 17, 1964

3,157,414
SWIVEL JOINT FOR HYDRAULIC DREDGE
PIPE LINES
Patrick Henry Sturm, Riviera Beach, Fla., assignor to Trans-State Dredging Company, Fort Pierce, Fla., a corporation of Florida
Filed Aug. 28, 1961, Ser. No. 134,188
8 Claims. (Cl. 285—61)

The present invention relates to flexible pipe joints, and more particularly to swivel joints for use in connecting relatively large pipes such as are employed in hydraulic dredging operations.

While my invention may be applied to either the suction pipe or the discharge pipe of a hydraulic dredge, it is especially intended for use in connecting floating discharge pipe lines to the dredge so as to permit free swinging movements of the dredge without imparting movement to the floating discharge line and without imposing heavy strains on the latter.

My improved swivel joint also allows relative movement of the dredge and the floating discharge pipe line when operating in unsheltered areas under rough water conditions, or when otherwise subjected to wave actions as attributed to passing ships or to other causes.

In the operation of hydraulic dredges, a spud is usually dropped at the stern of the dredge and is sunk into the bottom so as to serve as a pivot about which the dredge swings during the dredging operations. The frequency of these swings may vary anywhere from one swing per hour to one swing per minute, more or less, depending on the type of work and/or the conditions encountered. Accordingly, a sturdy and reliable flexible joint is required for connecting the floating discharge pipe line to the discharge pipe on the dredge, said latter pipe usually extending from the pump, along the deck of the dredge to the stern where it is coupled in an appropriate manner to the floating discharge pipe line. Under some conditions, the floating discharge pipe line may be of considerable length, as needed to direct the spoils to the desired point of deposit, and in order to rapidly and effectively carry out the dredging operations, the pressure developed in the discharge pipe line may be considerable, depending on the capacity and operating pressure of the dredge pump. Thus, the swivel joint used in connecting the dredge to the floating discharge pipe line preferably should be of a form which is capable of withstanding relatively high pressures without leaking, and should be sturdy and reliable so as to avoid the necessity of frequent repair or other maintenance service or replacement, with consequent excessive and costly interruptions of dredging operations.

Perhaps the most common way of connecting the discharge pipe of the dredge to a floating discharge line is to join them together by a heavy rubber or other flexible sleeve or hose, but such connections are not sufficiently flexible to avoid transmitting undesirable motion to the floating pipe line, and if usable at all, such connections are usually confined to pipes of relatively small size. Moreover, flexible sleeve or hose connections of this type are difficult to install, as well as subject to excessive leaks and relatively rapid deterioration, thus necessitating frequent maintenance service or replacement.

Another type of connection commonly used has the form of a ball and socket joint, but such joints have never been readily available commercially in all sizes to fit the full range of discharge pipe sizes which may vary from about 6 or 8 inches in diameter to 36 inches or more, according to the capacity of the dredges that are in present day use. Such ball and socket joints, as well as butt swivel joints embodying packing seals, have usually been confined to use with discharge pipes falling in the lowest portion of the size range referred to above, and under conditions where the operating pressure does not exceed about 50 pounds per square inch. Even then, they have a comparatively short life due to rapid wear and excessive leakage, and are subject to frequent and costly maintenance service, repairs and replacement.

The present invention has for its primary object to provide an improved swivel joint which is comparatively simple in construction, applicable to all sizes of discharge pipe lines, including those of the large sizes employed with large dredges and capable of withstanding relatively high pressures without leakage.

A further object of the invention is to provide an improved swivel joint of the aforementioned type which is comparatively frictionless and which is so constructed as to minimize and substantially eliminate wear, erosion and corrosion, thus affording substantially trouble-free operation, with little or no attention or service being required after initial assembly and installation, except for an occasional lubrication which is simple and can be quickly achieved.

A still further object is to provide improved anti-friction means for swivel joints of the type referred to above, said anti-friction means being compact and sturdy in form, and serving to sustain the weight of the joint and thereby reduce to a minimum the force required to swing the joint about a vertical axis, and also serving to resist lateral thrusts on the joint resulting from the action of the swing drum cables in swinging the dredge, or resulting from current, wind and tide effects.

My improved anti-friction means aforementioned preferably includes a ball bearing assembly arranged adjacent to one end of one part of the swivel joint to sustain the load of the joint, and additionally includes roller means arranged adjacent to the opposite end of the same joint part and in axially spaced relation to the ball bearing assembly aforesaid, to restrain the joint against any misalignment which would tend to cause the joint to bind or otherwise impose strains thereon which would make the joint hard to turn.

Another object of my invention is to provide an improved swivel joint of the ball and socket type, and in which sealing means of self-sealing form or action is provided to preclude leakage of the joint, and which actually assures a more effective sealing action, the greater the pressure thereon.

Other objects and advantages of the invention will be hereinafter described or will become apparent from the following description and the novel features thereof will be defined in the appended claims.

In the drawings:

FIG. 5 is a bottom plan view of the swivel joint, and particularly illustrating the anti-friction rollers;

FIG. 6 is a perspective detail view of one of the tubular parts or components of the swivel joint, this component being enlarged or flared outwardly at its upper end and providing a spherical socket therein;

FIG. 9 is a vertical sectional view as taken through the ball bearing assembly.

Figure 1:
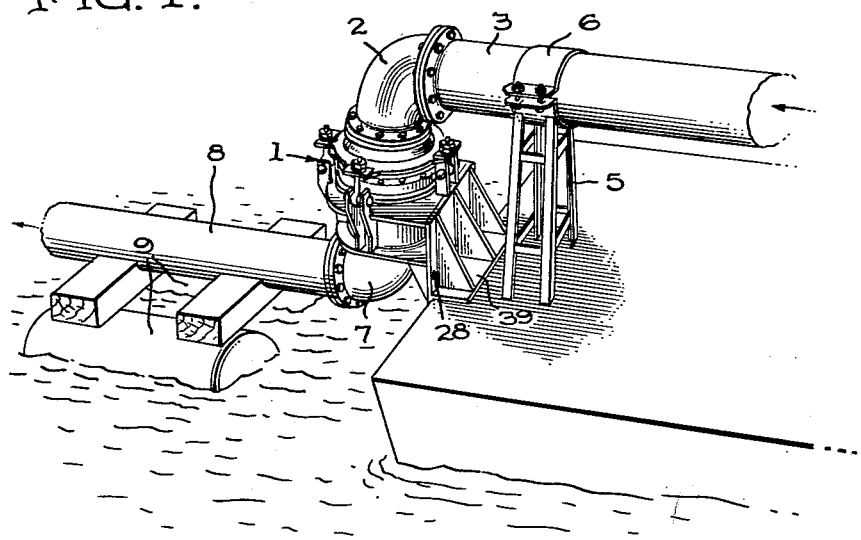
FIG. 1 is a perspective view showing my improved swivel joint as used for connecting a pontoon-supported discharge pipe line with a discharge pipe on a dredge, with the pontoons and the dredge being illustrated more or less diagrammatically and in fragmentary form.

For purposes of illustration, my improved swivel joint has been shown in FIG. 1 as installed on a dredge to connect the discharge pipe of the dredge to a floating, pontoon-supported discharge pipe line, only a fragmentary portion of the latter pipe line and only the stern portion of the dredge being illustrated in more of less diagrammatic form. As seen in this view, the swivel joint assembly is generally designated 1, and the upper end thereof is connected to an elbow 2, which in turn is connected to the after end of the discharge pipe 3 leading aft over the deck of the dredge 4. The forward end of the pipe 3 is suitably connected in the usual manner to the outlet of the dredge pump (not shown). To support the discharge pipe 3 and thus relieve the weight thereof from the swivel joint 1, a suitable stand 5 or other appropriate support is preferably provided near the stern of the dredge, the bottom of the stand being welded or otherwise anchored to the deck of the dredge, and the upper end of the stand being secured to the pipe 3 by an appropriate clamping collar or sleeve 6.

The lower end of the swivel joint 1 is connected to another elbow 7, which in turn is connected to the end of the floating pipe line 8 which is supported by suitable pontoons generally designated 9. The discharge pipe line 8 may be composed of lengths of pipe joined together in any conventional manner and supported at intervals along its length by pontoons or floats of any desired type, with the discharge pipe line being of such overall length as to direct the spoils pumped therethrough to the desired point of deposit, which in some cases may be a considerable distance from the dredge. In such instances, the pressure within the discharge pipe line, as well as within the swivel joint, may be relatively high and substantially in excess of 50 pounds per square inch. My improved swivel joint has been successfully installed and operated under pressures well in excess of 50 pounds per square inch, and is capable of sustaining operating pressures as high as 180 pounds per square inch or more, and with appropriate pump capacity, can effectively and rapidly operate with discharge pipe lines as long as one mile or more, if necessary, without the need for overhaul or any maintenance except for occasional lubrication. Its reliability under conditions of prolonged and continued periods of service, without leakage, has been thoroughly demonstrated under practical operating conditions.

As better seen in other figures of the drawings, my improved swivel joint is essentially composed of two tubular elements or components, respectively designated 10 and 11. The upper component 10 has a substantially spherical form and is provided with a radially extending flange 12 suitably welded thereto or otherwise forming a part thereof, said flange having bolt holes 13 provided therethrough at spaced intervals about the same for rigidly and securely attaching the spherical member 10 to the lower flanged end of the elbow 2 on the after end of the discharge pipe 3. The spherical end of the tubular member 10 is coaxially aligned with the tubular member 11, the latter being enlarged or flared upwardly and outwardly at its upper end and having a spherical socket 14 formed therein for cooperative seating engagement with the spherical or ball shaped member 10, as best shown in FIGS. 4 and 8.

Figure 4:
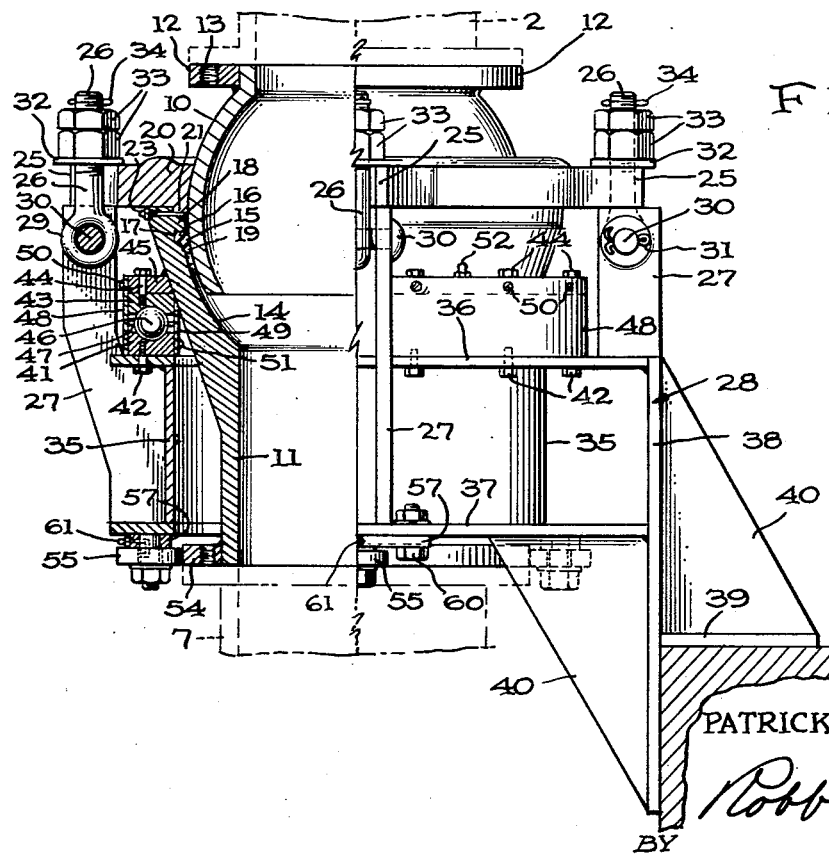
FIG. 4 is a view, partly in side elevation and partly in vertical section, of the swivel joint as installed at the stern of the dredge.
Figure 8:
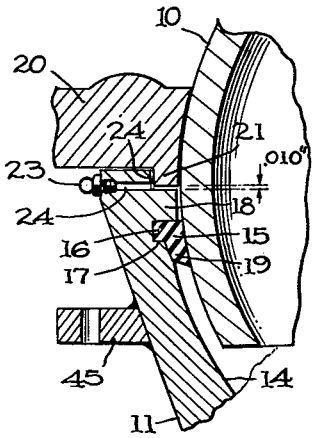
FIG. 8 is a fragmentary vertical sectional view on an enlarged scale, as taken through the seal of the swivel joint and additionally showing in greater detail the lubrication passages and spaces for this part of the joint assembly.

Interposed between the ball member 10 and the socket 14 of the lower tubular member 11 is a resilient seal or gasket 15, as best seen in FIGS. 4 and 8. This gasket may be composed of molded rubber or other suitable resilient material, and is so formed and arranged as to produce a more or less self-sealing action when subjected to pressure of the pumped fluid passing through the swivel joint and discharge pipe lines. As illustrated, it will be observed that the gasket is provided with a radially outwardly extended annular flange 16 which is seated in an annular groove 17 provided in the interior face of the upper end of the tubular member 11 which terminates in a radially inwardly extended flange 18 overlying the upper face of the gasket 15. The inner edge of the flange 18 is shaped to loosely fit the ball 10, and thus prevent binding against the latter during swinging movements of the joint. The gasket 15 is also provided with an integral annular skirt 19 extending below the flange 16 and lying between the ball 10 and the socket 14 which is spaced from the ball so as to permit the fluid being pumped through the swivel joint to exert pressure on the skirt 19 of the gasket and thus firmly press the skirt against the ball 10 to produce a more or less self-sealing action. Accordingly, the greater the pressure of the fluid within the swivel joint, the better the sealing action, which more effectively assures freedom from leakage around the swivel joint.

Encircling the ball member 10 is a retainer ring designated 20, said retainer ring snugly fitting against the ball 10 and being positioned immediately above the horizontal center of the ball 10 so as to prevent the ball from being displaced from the socket 14 after assembly of the swivel joint. The retainer ring preferably seats on the upper end of the tubular member 11, and its inner edge is provided with a downwardly extended annular flange 21 which extends below the extreme upper edge of the tubular member 11, at the upper end of the socket 14, said flange 21 seating in a recess 22 formed at the inner corner of the upper edge of the member 11. The flange 21 on the retainer ring 20 preferably terminates in slightly spaced relation to the upper face of the annular flange 18 on the tubular member 11, this spacing being on the order of about .010 inch so as to permit lubrication of the ball and socket components of the swivel joint, as permitted by a lubricant fitting 23 of conventional type which is mounted exteriorly of the tubular member 11 near the upper end thereof and communcates with a lubricant passage 24 which leads inwardly to the space between the flanges 21 and 18.

In order to retain the retainer ring 20 in cooperative retaining relation to the ball 10, the ring is provided with a plurality of bifurcated ears 25 extending radially from the outer edge thereof. Coacting with these ears 25 is a plurality of pivotally mounted latch bolts 26 which are secured to brackets 27 carried by a stationary base or frame generally designated 28. Each of the latch bolts 26 is provided with an eye at one end, as indicated at 29, through which a buttonhead rivet 30 extends, said rivet also extending through the spaced arms of the corresponding bracket 27. Each rivet may be secured in assembled position by a cotter pin 31 or in any other suitable manner as will permit the latch bolts to freely swing towards and away from the ears 25 of the retainer ring 20. When swung to their vertical positions to seat each latch bolt in the notches 25′ formed in the ears 25, a rectangular washer or pad 32 is applied onto the upper end of each latch bolt so as to overlie each ear 25, and a pair of nuts 33 are then preferably screwed on to the end of each latch bolt to firmly clamp the retainer ring in place. As an added safety precaution, cotter pins 34 may be additionally inserted through the upper ends of the latch bolts to prevent accidental displacement of the nuts 33.

The frame or base 28 encircles the swivel joint and supports the brackets 27, as well as serves to mount the swivel joint on the dredge. As shown in the drawings, the frame includes a cylindrical tube or pipe 35 which encircles the lower end of the tubular member 11 in outwardly spaced relation thereto. Flat plates 36 and 37 are welded or otherwise suitably secured to the upper and lower ends respectively of the tubular member 35 so as to extend radially outwardly therefrom, with one end of each plate abutting against and being welded to a vertical plate 38 to form a hanger or support by which the frame may be secured to the dredge. Welded to the forward face of the vertical plate 38 is a horizontally extended plate 39 which is adapted to seat against the deck of the dredge when the frame is mounted on the dredge as by welding the plates 38 and 39 to the stern of the dredge, in the case of a steel dredge, or otherwise anchoring these plates to the dredge in any suitable manner, according to the nature and construction of the dredge. Appropriate triangular brace plates or gussets 40 are preferably welded to the forward and after faces of the vertical plate 38, in spaced relation to each other, to assure rigidity of the mounting.

Figure 2:
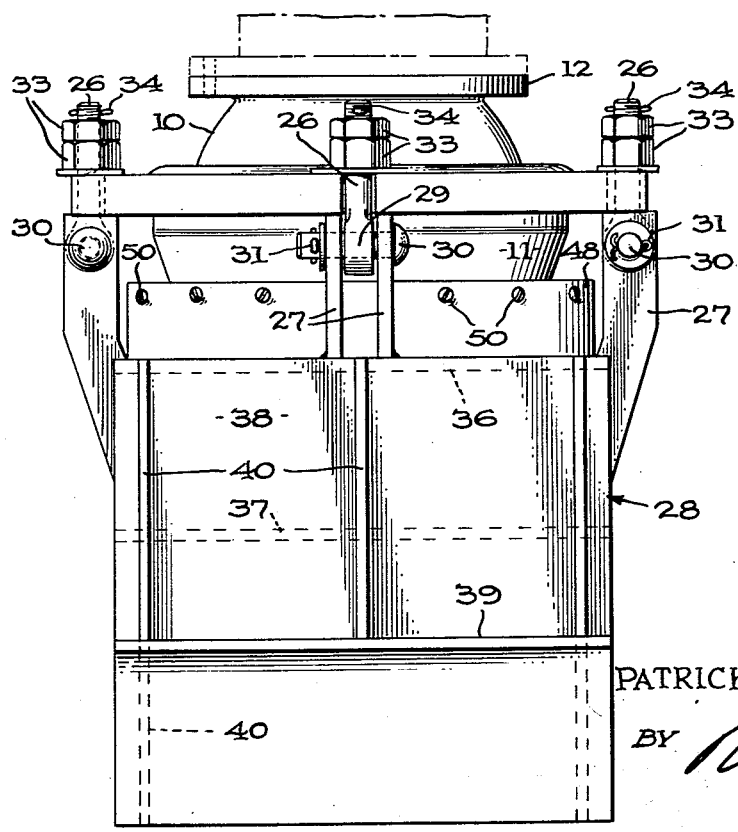
FIG. 2 is a view in front elevation of the swivel joint as seen looking astern from a position on the dredge.
Figure 3:
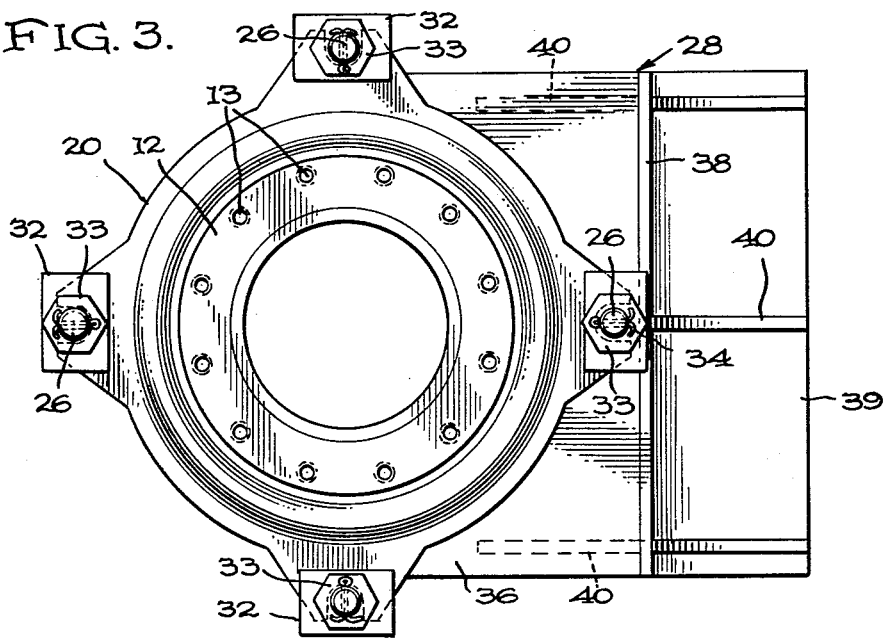
FIG. 3 is a view of the swivel joint in top plan.
Figure 7:
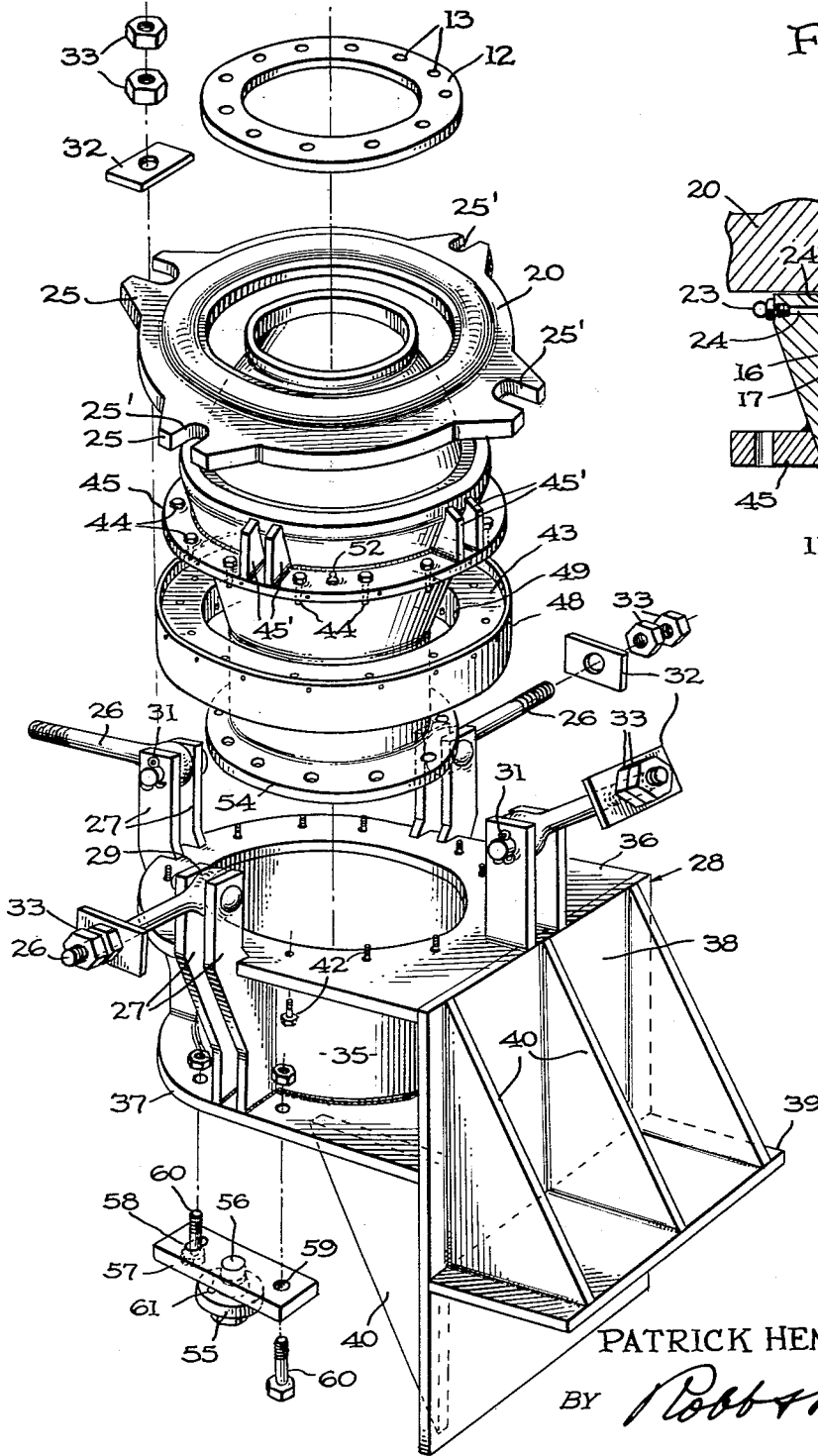
FIG. 7 is an exploded perspective view of my improved swivel joint assembly.

As best seen in FIGS. 2, 4 and 7, the brackets 27 for the pivotal bolts 26 are suitably welded to the cylindrical member 35 of the fabricated base assembly 28, as well as to the upper and lower plates 36 and 37 of this assembly, said brackets being arranged equidistantly from each other. Seated on the upper face of the upper plate 36, and disposed coaxially with the circular member 35 is a lower annular ball race member 41. This race member is suitably anchored to the plate 36 as by means of a plurality of spaced cap screws or stud bolts 42. A similar upper ball race member 43 is provided and is secured by cap screws or stud bolts 44 to an annular flange 45 which is welded to the tubular member 11 adjacent to the upper end thereof, said flange 45 being suitably reinforced or stiffened by a series of bracing plates 45' welded thereto and to the outer face of the member 11 at intervals thereabout. Balls 46 are interposed between the upper and lower race members 41 and 43, and the balls are preferably maintained in separated relation by a suitable separator ring 47.

In order to exclude dirt and other foreign matter from the ball bearing assembly just described, and to also aid in retaining lubricant in the ball bearing assembly, the assembly preferably includes outer and inner shields, respectively designated 48 and 49, of annular form, and which are suitably secured to the outer and inner edges of the race members 41 and 43 by screws 50 and 51.

Mounted in the flange 45 which is provided adjacent to the upper end of the tubular member 11, is a plurality of lubricant fittings 52 which communicate with appropriate lubricant passages 53 leading through the upper ball race member 43 so as to permit the ball bearing assembly to be easily and quickly lubricated. By virtue of this ball bearing assembly, the weight of the tubular member 11, as well as any load imposed thereon in a downward direction through the connection of this member with the floating discharge pipe line 8, is sustained by the bearing and borne directly by the stationary base or frame 28. The anti-friction action of the ball bearing assembly thus allows free pivotal swinging movements of the dredge relative to the floating discharge pipe line, with the ball and socket members of the swivel joint constituting a substantially frictionless joint.

To insure against misalignment of the tubular members 10 and 11, respectively constituting the ball and socket components of the swivel joint, additional anti-friction means is preferably provided on the lower part of the base or frame 28 to coact with the annular coupling flange 54 which is provided at the extreme lower end of the tubular member 11 for connection with the corresponding flange on the upper end of the elbow 7 by which the swivel joint is connected to the floating discharge pipe line 8. These latter anti-friction means preferably have the form of a plurality of rollers 55, each roller being mounted for free rotation on a spindle or axle 56 suitably welded or otherwise fixed to a bracket 57. Each bracket is preferably of generally rectangular form and provided with a pair of bolt holes formed therein adjacent the opposite ends thereof as indicated at 58 and 59, respectively. Anchor bolts 60 may be employed to secure each bracket to the lower face of the bottom plate 37 of the fabricated base or frame assembly 28. At least one of the bolt holes in each roller mounting bracket 57, such as the hole 58, is elongated in a direction transversely of the bracket so as to allow limited radial adjustment of the rollers 55 relative to the flange 54 on the lower end of the tubular member 11, as may be needed to accurately align the components of the swivel joint. These rollers additionally serve to sustain lateral thrusts acting on the member 11 as the result of swinging movements imparted to the dredge by the winding drum cables, or otherwise by currents, wind and tide effects. Each roller assembly is preferably equipped with a lubricant fitting 61 so as to insure free rotation of the rollers on their axles or spindles at all times.

It will be apparent from the foregoing that my improved swivel joint is simple and sturdy in form, as well as substantially frictionless and reliable in operation, with little or no care or maintenance being necessary other than occasional lubrication of the parts equipped with convenient lubricating fittings. Leakage of the swivel joint is precluded by an effective flexible sealing gasket which assures effective sealing of the joint under all operating conditions, including those requiring relatively high pressures.

While the specific details have been herein shown and described, my invention is not confined thereto, as changes and alterations may be made without departing from the spirit thereof as defined in the appended claims.

I claim:

1. A swivel joint of the class described, comprising a pair of tubular members having cooperatively opposed ends disposed in coaxial alignment for relative rotation about a fixed axis, a stationary mounting frame encircling said joint, and anti-friction means interposed between said frame and one of the tubular members for allowing free rotary movements of said latter tubular member relative to the opposed tubular member, the cooperative ends of the tubular members being respectively of ball and socket form, said anti-friction means being disposed in the zone of the socketed end of one tubular member and serving to support the weight of the joint, and additional anti-friction means interposed between the frame and the latter tubular member in axially spaced relation to the first-mentioned anti-friction means for resisting lateral thrusts imposed on the latter tubular member and preventing misalignment thereof with respect to the opposed tubular member.

2. A swivel joint as defined in claim 1, wherein the anti-friction means includes a ball bearing assembly, said ball bearing assembly including an annular ball race member carried by and radially extended from one of the tubular members, a second annular ball race member carried by and radially extended from the mounting frame and disposed in opposed axially spaced relation to the first mentioned race member, and a plurality of balls interposed between said race members.

3. A swivel joint as defined in claim 1, wherein the anti-friction means includes a ball bearing assembly, said ball bearing assembly including an annular ball race member carried by and radially extended from one of the tubular members, a second annular ball race member carried by and radially extended from the mounting frame and disposed in opposed axially spaced relation to the first mentioned race member, a plurality of balls interposed between said race members, and annular shield members secured to the race members and spanning the space therebetween and extending about the inner and outer peripheries respectively of the race members to enclose the balls.

4. A swivel joint as defined in claim 1, wherein the anti-friction means includes a ball bearing assembly, said ball bearing assembly including an annular ball race member carried by and radially extended from one of the tubular members, a second annular ball race member carried by and radially extended from the mounting frame and disposed in opposed axially spaced relation to the first mentioned race member, a plurality of balls interposed between said race members, annular shield members secured to the race members and spanning the space therebetween and extending about the inner and outer peripheries respectively of the race members to enclose the balls, and means for admitting and directing a lubricating medium into the ball bearing assembly and about the balls.

5. A swivel joint as defined in claim 1, wherein said additional anti-friction means includes a plurality of rollers carried by the mounting frame and disposed in equidistantly spaced relation to each other and engageable with one of the tubular members in a zone substantially spaced axially from the opposed tubular member for restraining said one tubular member against lateral movements relative to the other tubular member.

6. A swivel joint as defined in claim 1, wherein said additional anti-friction means includes a plurality of rollers carried by the mounting frame and disposed in equidistantly spaced relation to each other and engageable with one of the tubular members in a zone substantially spaced axially from the opposed tubular member for restraining said one tubular member against lateral movements relative to the other tubular member, each of said rollers being rotatably mounted on a bracket, and each bracket being adjustably mounted on the frame in such manner as to permit radial adjustment of its roller toward and away from the central axis of the swivel joint.

7. A swivel joint as defined in claim 1, wherein said additional anti-friction means includes a plurality of rollers carried by the mounting frame and disposed in equidistantly spaced relation to each other and engageable with one of the tubular members in a zone substantially spaced axially from the opposed tubular member for restraining said one tubular member against lateral movements relative to the other tubular member, each of said rollers being rotatably mounted on a bracket, and each bracket being adjustably mounted on the frame in such manner as to permit radial adjustment of its roller toward and away from the central axis of the swivel joint, and each of said brackets having means for directing a lubricating medium about the axis of its roller.

8. A swivel joint of the class described, comprising a pair of opposed tubular members disposed in coaxial alignment, the contiguous end of one of said members being of spherical ball form and the opposed end of the other tubular member defining a spherical socket in which the spherical ball end of the other tubular member is seated, an annular retainer ring member encircling the spherical ball aforesaid and seated on the extreme end of the socketed tubular member, latch means releasably engageable with the retainer ring for restraining said ball from axial displacement from said socket, and a mounting frame encircling the socketed tubular member and supporting the latch means aforesaid and the socketed tubular member, said mounting frame comprising a tubular shell spaced radially outwardly about the socketed tubular member aforesaid and disposed in coaxial relation therewith, plate members connected with and encircling the respective opposite ends of said shell and extended radially outwardly therefrom in spaced parallel relation to each other and perpendicular to the central axis of said shell, and means interconnected with the extended plate members at one edge thereof for anchoring the mounting frame to a fixed support, said last-mentioned means including a joining plate member connected to the corresponding extended edges of the parallel plate members aforesaid and extended in one direction beyond the parallel plate members in spaced relation to the shell and socketed tubular member and parallel to the central axis of the latter, and another plate member secured to the joining plate member aforesaid and extended therefrom in perpendicular relation thereto and defining therewith an angular hanger.

References Cited in the file of this patent

UNITED STATES PATENTS

| | | |
|---|---|---|
| 1,425,635 | Dod | Aug. 15, 1922 |
| 1,484,786 | Johnston | Feb. 26, 1924 |
| 1,808,066 | Plumber | June 2, 1931 |
| 1,946,110 | Plummer | Feb. 6, 1934 |
| 2,198,820 | How | Apr. 30, 1940 |
| 2,501,166 | Fraser et al. | Mar. 21, 1950 |
| 2,565,070 | Foley | Aug. 21, 1951 |